3,488,745
BEAD SIZE DISTRIBUTION CONTROL IN
SUSPENSION POLYMERIZATION
Harold A. Wright, Murrysville, Pa., assignor to Koppers Company, Inc., a corporation of Delaware
Filed June 6, 1966, Ser. No. 555,538
Int. Cl. C08f 1/11
U.S. Cl. 260—93.5                                     4 Claims

ABSTRACT OF THE DISCLOSURE

Polymer beads of an extremely narrow diameter bead size range are produced by polymerizing a vinyl aromatic monomer in an aqueous suspension which is stabilized by the presence of a finely divided phosphate and 0.015 to 2.0 percent of specific organic sulfonate or sulfamate surface active extenders.

---

This invention relates generally to the preparation of polymer beads by polymerizing vinyl aromatic monomers in aqueous suspension. More particularly, it relates to the process for preparing polymer beads having a narrow size range distribution.

It is well known that beads of polymer can be prepared by dispersing at least one vinyl aromatic monomer in the form of droplets in water with the aid of agitation and a suspending system and heating the suspension to cause the monomer to polymerize into hard polymer beads. The suspending system keeps the polymerizing droplets from agglomerating when they reach a degree of polymerization where they become sticky and would otherwise agglomerate into one mass of polymer and monomer if it were not for the presence of the suspending system.

Grim Patent 2,673,194 describes a process for preparing polymer beads in aqueous suspension comprised of finely divided phosphates in combination with certain surface active extenders which are present in amounts of 0.0005 to 0.05 percent by weight of total suspension. D'Alelio Patent 2,948,710 describes the preparation of polymer beads using a suspending system of tricalcium phosphate with sodium β-naphthalene sulfonate, as the surface active extender, present in amounts of 0.1 to 2.00 percent by weight of total suspension. However, it has been found that the foregoing systems produce polymer beads having a broad size distribution, the individual beads ranging in diameter from less than 300 microns to above 2,000 microns with the average bead diameter being dependent upon the amount of suspending agent and extender used based on the amount of monomer present. The average bead diameter can be controlled to some extent by varying the parameters of the system such as the ratio of suspending agent to extender or suspending agent and extender to monomer. Although the average size of diameter is changed, the whole range of diameters including some which are either greater than 2000 microns (oversize) or less than 300 microns (undersize) will be produced. The undersize and oversize material must be removed by screening since it will interfere with processing equipment when the polymer beads are to be used for certain applications such as in making expanded polymer foams. Such oversize and undersize material must be processed into another form, such as by pelletizing, before it can be used in molding applications.

This problem of "undersize" and "oversize" beads becomes particularly acute in dealing with beads which have an extremely small diameter since such beads (of different size) are difficult to separate because of their extremely small size and their tendency to acquire a static charge and stick to the equipment and the larger beads. Beads of a small average diameter, for example 400 to 500 microns, are used for making expandable polymer beads for molding thin walled foamed articles such as cups. When the conventional suspending systems are adjusted to produce such small beads, a commercially prohibitive amount of undersize beads or fines are also produced. In addition to excessive fines the yield of the desired bead size is not very high with a substantial amount of larger beads being produced which have to be diverted to other applications. Since sales requirements for particular size of beads vary appreciably the inventory problem becomes acute. A suspension system is therefore needed by which bead size can be controlled within a narrow range so that production and sales requirements can be balanced.

A class of surface active extenders has now been found by which polymer beads having an extremely narrow diameter size range can be produced. In accordance with this invention beads having either a large or small average bead diameter can be produced without, at the same time, producing a large amount of oversize or undersize material by polymerizing a vinyl aromatic monomer in an aqueous suspension which is stabilized by the presence of a finely divided phosphate, difficultly soluble in water, and containing for each phosphate group at least three equivalents of a metal, the carbonate of which is only slightly soluble in water, when there is used in amounts of from about 0.015 to 2.0 percent by weight of total suspension a surface active extender which is an organic sulfonate or sulfamate and that has a surface tension between about 61 and 45 dynes per centimeter when 0.1 percent by weight is dissolved in 10 percent aqueous sodium chloride.

Examples of useful surface active extenders which are alkali metal salts or organic sulfamates and sulfonates includes, sodium dipropyl sulfosuccinate, sodium N-isopropyl cyclohexyl sulfamate, sodium p-isopropylbenzene sulfonate, sodium β-tetrahydronaphthalene sulfonate, potassium acenaphthene-5-sulfonate, sodium p-biphenyl sulfonate, sodium 3-(trimethylsilyl) propane sulfonate, sodium p-vinylbenzene sulfonate, sodium 2,4,5-trimethylbenzene sulfonate, etc.

This group of auxiliary suspending agents has been found to possess a certain critical degree of surface activity, which when used with a phosphate suspending agent such as tricalcium phosphate will produce polymer beads having a very narrow bead diameter distribution.

It is believed that the reason for the effectiveness of such surface active extenders lies in their structural and electronic characteristics. However, the exact reason for their surprising effectiveness is not known. The usefulness of an extender for this invention can be established by determining the surface tension of a 0.1 percent by weight solution of the extender in a 10 percent aqueous sodium chloride solution. Whereas little apparent difference between the extenders of the invention and uneffective, prior art extenders can be detected by a superficial examination of their molecular structure or by surface tension measurements in plain water (the latter differences being within experimental error), the difference becomes clear when the measurements are made in a 10% aqueous NaCl solution. It is known that surface tension measurements in the presence of an electrolyte such as sodium chloride magnifies the surface activity of compounds. This is described by Schwartz and Perry "Surface Active Agents—Their Chemistry and Technology" volume 1, Interscience Publishers, Inc., New York, 1949, p. 286. It has been found that the extenders effective in the invention are those which give a surface tension, when present in concentrations of 0.1 percent by weight in 10 percent aqueous sodium chloride, between about 61 and 45 dynes per centimeter. Compounds having surface tensions above or below this range do not produce the unique results achieved by using the compounds of the invention.

The amount of extender which will produce beads having a narrow size range distribution varies from about 0.015 percent by weight of total suspension, below which the suspensions have a tendency to become unstable and the bead size becomes very large, to about 2.0 percent by weight, above which concentration amounts of agent are excessive and unnecessary.

The finely divided phosphates useful in the invention are conventional and are those described for example by Grim patent 2,673,194. They include those finely divided phosphates, difficultly soluble in water, containing for each phosphate group at least three equivalents of a metal the carbonate of which is only slightly soluble in water, e.g., tricalcium phosphate, hydroxyapatite, magnesium phosphate, etc. The amount of phosphate employed will range from about 0.1 to 5 percent by weight of total suspension.

As previously indicated, the average particle size of polymer bead produced in the suspension polymerization system depends upon the amount of suspending agent and extender employed in the suspension with the larger amounts of suspending agents yielding beads of a smaller average particle size.

The process of the invention is applicable in the suspension polymerization of vinyl aromatic monomers such as styrene, $\alpha$-methyl styrene, mono and di-chlorostyrenes, vinyl naphthalene, as well as copolymers of vinyl aromatic monomers with such monomers as acrylonitrile, divinylbenzene, methyl and ethyl acrylates, diallyl esters of dibasic aliphatic or aromatic acids, butadiene, and polymers capable of further polymerization such as styrene-butadiene, styrene-isoprene and polybutadiene rubbers.

Polymer beads can be produced by the process of the invention in aqueous suspension using monomer to water ratios which vary from 0.3 to 1.5 part monomer per 1.0 part water with the higher monomer to water ratios being preferred from an economical standpoint.

The time and temperature cycles for the polymerization can conveniently be those described for example in D'Alelio Patent No. 2,692,260 in which free radical initiating catalysts are added to the system which are soluble in the monomer to increase the rate of polymerization. Useful catalysts include for example organic peroxides such as benzoyl peroxide, t-butyl perbenzoate, lauroyl peroxide and other free radical producing catalysts such as azobisisobutyronitrile.

Figure 1:
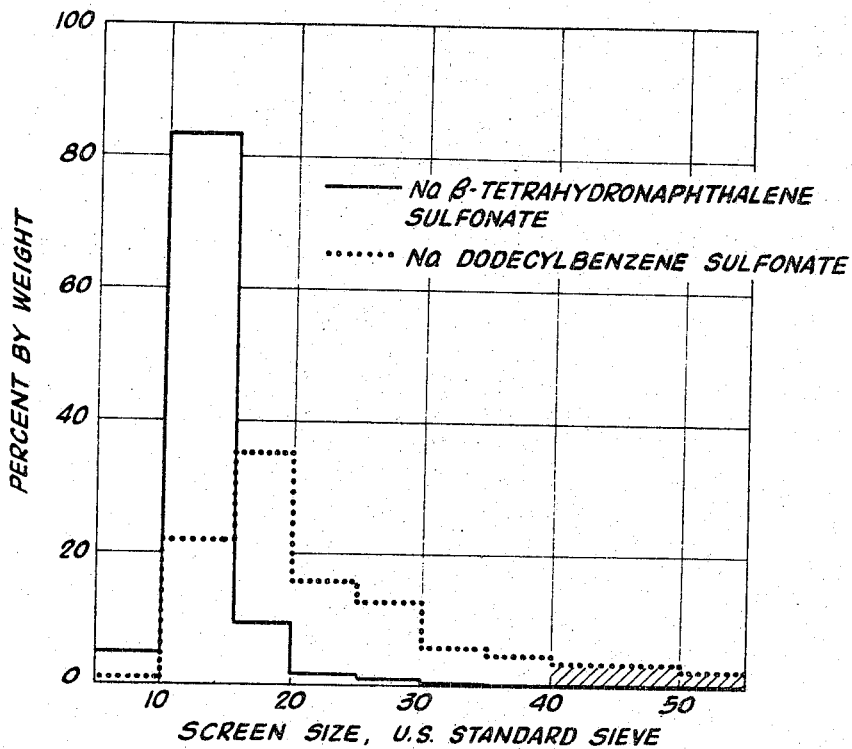
FIGURES 1 to 3 are bar graphs comparing bead size distributions obtained using an extender of the invention sodium $\beta$-tetrahydronaphthalene sulfonate and a conventional extender sodium dodecylbenzene sulfonate (Nacconol NRSF).

The invention is further illustrated by but is not intended to be limited to the following examples wherein parts are parts by weight unless otherwise indicated.

EXAMPLE I-A

In order to illustrate the definition of the extenders which are useful in the invention, as compared to compounds which are not, a series of surface tension determinations were carried out in 10 percent sodium chloride using a DuNoüy tensiometer in which the surface tensions of 0.1 percent by weight solutions of the compounds listed in Table I below were determined. The test solutions were prepared by mixing equal volumes of 20% aqueous sodium chloride and 0.2% by weight aqueous solutions of the extenders to be tested. The measurements were made at 25° C. and are recorded in Table I.

It should be noted that the Nacconol NRSF (sodium dodecylbenzene sulfonate) and the sodium dioctyl sulfosuccinate determinations were carried out in plain water. This was because these extenders were not completely soluble in 10% sodium chloride at the 0.1% by weight concentration range. It can be seen from the results that even in plain water the extenders are a very powerful surface active agents giving surface tensions of only 34.1 and 28.7 dynes per centimeter or well below the surface tension range of the novel extenders, even without the magnifying effect of the presence of the electrolyte.

EXAMPLE I-B

A series of suspension polymerizations were carried out in a two liter flask equipped with a 45° pitch uplifting impeller using a standard recipe except for the extender used. The purpose was to illustrate the difference in bead size distribution obtained with agents of the invention as compared to conventional agents using a standard recipe without attempting to optimize the process to minimize off-grade material. To the two liter flask there was added in the following order 750 parts of water having dispersed therein as the suspension system, 0.75 part of the extender shown in Table I below and 3.75 parts of tricalcium phosphate, 750 parts of the monomer, styrene, having dissolved therein 3.0 parts of the catalyst comprising 1.9 parts of benzoyl peroxide and 1.1 parts of t-butyl perbenzoate. The mixture was agitated at 400 r.p.m. and the suspension heated to 90° which took about one hour; the temperature was maintained at 90° C. for 8 hours. The suspension was then cooled and the beads were separated from the aqueous phase and washed with water by means of a centrifuge. The beads were air dried

TABLE I.—SCREEN SIZE DISTRIBUTION, U.S. STANDARD SIEVE

| Extender | Surface tension in 10% NaCl | Oversize 10 | A Cut 16 | B Cut 20 | B Cut 25 | C Cut 40 | Fines −40 | Bead Diameter in mm. at 10% | Bead Diameter in mm. at 90% | Bead size [1] distribution, mm.[10] / mm.[90] |
|---|---|---|---|---|---|---|---|---|---|---|
| None | 74.8 | | | | | | | | | |
| Na-butane sulfonate | 73.2 | | | Suspension Failure | | | | | | |
| Na 2,4,6-trimethylbenzene sulfonate | 72.0 | 19.7 | 21.4 | 12.1 | 7.3 | 23.9 | 15.6 | >2.40 | 0.35 | >7.0 |
| Na 3,4-dimethylbenzene sulfonate | 71.6 | 16.9 | 18.1 | 15.6 | 10.3 | 32.6 | 6.5 | 2.40 | 0.45 | 5.3 |
| Na diethyl sulfosuccinate | 71.2 | | | Suspension Failure | | | | | | |
| Na $\beta$-Naphthalene sulfonate | 68.5 | | | Suspension Failure | | | | | | |
| Na N-ethyl cyclohexyl sulfamate | 67.6 | 6.1 | 18.0 | 17.8 | 11.3 | 39.2 | 13.9 | 1.70 | 0.38 | 4.5 |
| Na dipropyl sulfosuccinate | 61.0 | 1.0 | 5.2 | 7.7 | 7.2 | 51.4 | 27.5 | 1.00 | 0.34 | 2.9 |
| Na N-isopropyl cyclohexyl sulfamate | 59.0 | 1.3 | 10.5 | 11.8 | 10.2 | 54.8 | 11.4 | 1.30 | 0.42 | 3.1 |
| Na p-Isopropylene sulfonate | 58.3 | 5.3 | 14.7 | 17.1 | 12.4 | 36.7 | 13.8 | 1.60 | 0.40 | 4.0 |
| Na $\beta$-Tetrahydronaphthalene sulfonate | 58.2 | 1.0 | 9.9 | 15.3 | 13.1 | 53.0 | 7.7 | 0.75 | 0.28 | 2.7 |
| K acenaphthalene-5-sulfonate | 56.6 | Nil | 7.2 | 16.5 | 10.9 | 39.5 | 25.9 | 1.12 | 0.32 | 3.5 |
| Na p-Biphenyl sulfonate | 57.8 | 1.8 | 10.1 | 13.4 | 10.7 | 56.1 | 7.9 | 1.26 | 0.43 | 2.9 |
| Na 3-(trimethylsilyl) propane sulfonate | 50.5 | 1.7 | 8.6 | 14.0 | 12.3 | 45.3 | 18.1 | 1.22 | 0.36 | 3.4 |
| Na p-Vinylbenzene sulfonate | 48.8 | Nil | 13.4 | 21.1 | 15.2 | 45.3 | 5.0 | 1.30 | 0.48 | 2.7 |
| Na 2,4,5-trimethylbenzene sulfonate | 45.5 | 1.8 | 11.6 | 18.9 | 15.0 | 40.9 | 11.8 | 1.35 | 0.40 | 3.4 |
| Na 2-methyl-5-isopropylbenzene sulfonate | 34.7 | Nil | 4.8 | 6.0 | 6.9 | 41.4 | 40.9 | 0.86 | 0.20 | 4.3 |
| Na dibutyl sulfosuccinate | 27.9 | 12.7 | 12.6 | 8.4 | 8.1 | 52.8 | 5.4 | 2.18 | 0.46 | 4.7 |
| Na triisopropylnaphthalene sulfonate | 32.1 | | | Suspension Failure | | | | | | |
| Na dodecylbenzene sulfonate | [2] 34.1 | | | Suspension Failure | | | | | | |
| Na dioctyl sulfosuccinate | [2] 28.7 | | | Suspension Failure | | | | | | |

[1] The ratio of the bead size (mm.) at 10% by weight accumulated beads to the bead size at 90% by weight accumulated beads.
[2] In plain water.

on trays after which they were screened into portions, over 10 mesh U.S. Standard Sieve (oversize); through 10 and on 16 mesh U.S. Standard Sieve (A cut); through 16 and on 20 mesh U.S. Standard Sieve and through 20 and on 25 mesh U.S. Standard Sieve (B cut); through 25 and on 40 mesh U.S. Standard Sieve (C cut); and through 40 (fines). The bead diameter distribution is recorded in Table I below. The bead size distribution was calculated by determining the ratio of the bead diameter in millimeters at 10 percent by weight accumulated beads to the bead diameter at 90 percent by weight accumulated beads.

It can be seen that extenders having surface tensions within a range of 45 to 61 dynes per centimeter, with the recipe employed, gave bead size distribution ratios between 2.7 to 4.0 whereas the extenders having either too little surface activity (surface tensions greater than 61 dynes per centimeter) or too much surface activity (surface tensions of less than 45 dynes per centimeter) either gave bead size distributions greater than 4.0 or at the concentration employed in the recipe failed to produce a stable suspension.

EXAMPLE II

To illustrate the effectiveness of the extenders of the invention in producing beads having a certain optimum size range as compared to extenders of the prior art, a series of polymerizations were carried out using either sodium β-tetrahydronaphthalene sulfonate or Nacconol NRSF (sodium dodecylbenzene sulfonate) as the extender. The amount of suspending system was adjusted to produce an optimum amount of either large (A cut), medium (B cut) or small (C cut) beads.

Figure 2:
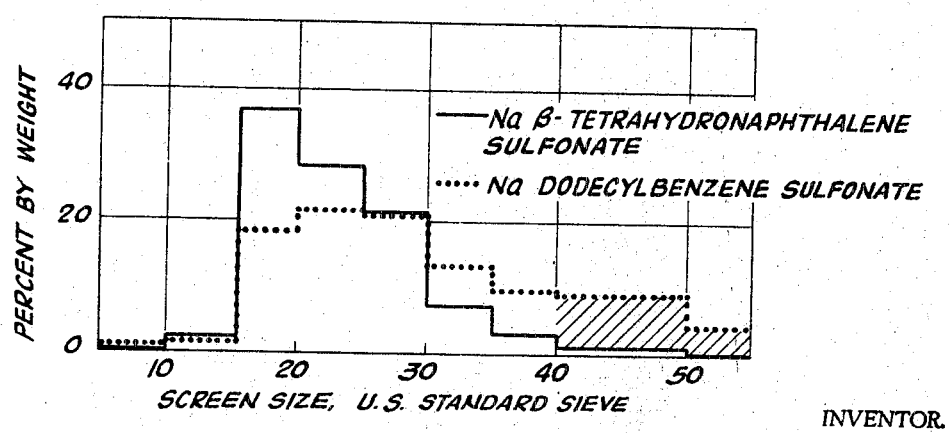
Figure 3:
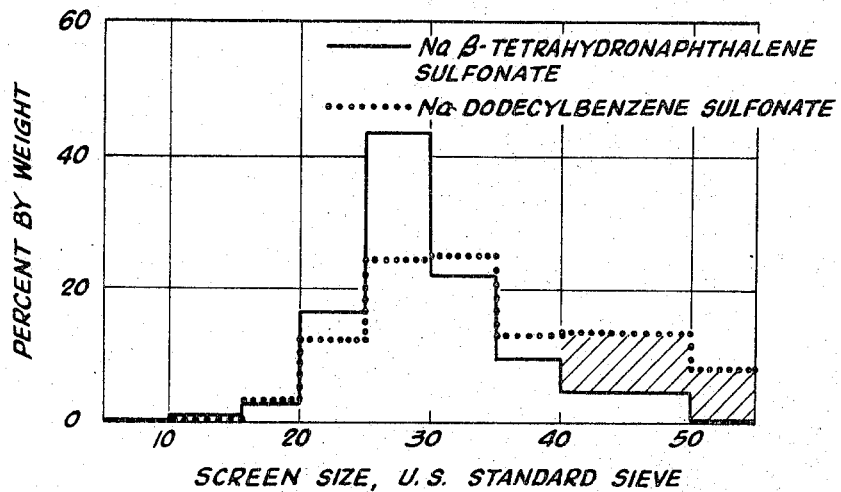

To a reactor equipped with a two bladed impeller there was added 42 parts of water containing as suspending agents tricalcium phosphate and sodium β-tetrahydronaphthalene sulfonate or Nacconol NRSF in the amounts shown in Table II above, along with 58 parts of styrene monomer having dissolved therein 0.171 part of the catalyst comprising .145 part benzoyl peroxide and 0.26 part of t-butyl perbenzoate. The suspension was agitated at 68 r.p.m. and heated to 90° C. which took 60 minutes. The suspension was maintained at 90° C. for 365 minutes after which it was cooled and the beads separated by centrifuge, washed with water and air dried. The beads were screened. The screen analysis, U.S. Standard Sieve, is shown in Table II above and illustrated graphically in FIGS. 1–3. It can be seen that the extender of the invention not only produced greater amounts of beads having the desired diameters but the amount of unusable product was sharply reduced, in that the prime yield of product obtained using sodium β-tetrahydronaphthalene sulfonate was from 95.2 to 98.5% by weight of monomer charged. The prime yield of product obtained by using Nacconol NRSF was from 93.8% down to only 77.0% by weight of monomer charged. This latter figure represents a commercially prohibitive loss of product.

EXAMPLE III

Figure 4:
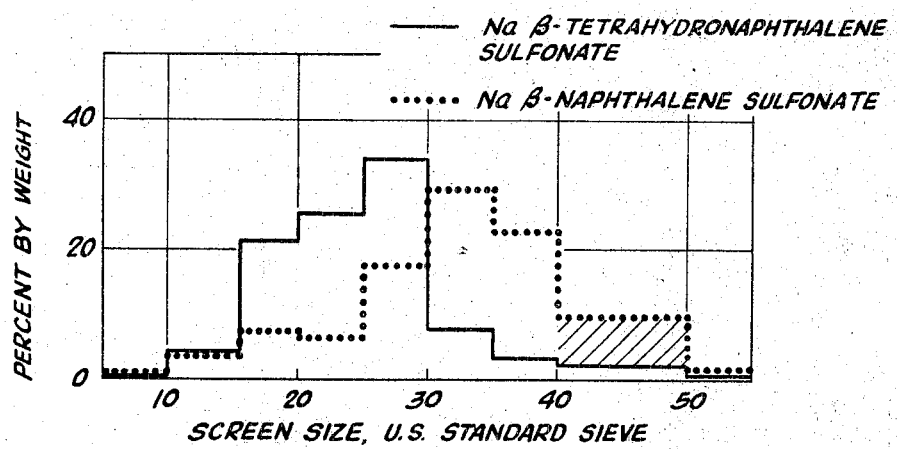
FIGURE 4 is a bar graph showing bead size distribution obtained by utilizing an extender of the invention sodium $\beta$-tetrahydronaphthalene sulfonate as compared to a conventional extender sodium $\beta$-naphthalene sulfonate.

In order to illustrate the superiority of the agents of the invention over the agent of D'Alelio, sodium β-naphthalene sulfonate, the following two polymerizations were carried out in a two-liter flask equipped with a 45° pitch 2 bladed uplifting impeller. To the two-liter flask there was added in the order named 750 parts of water containing as the suspension system 3.0 parts of tricalcium phosphate and in the first polymerization 3.0 parts of sodium β-tetrahydronaphthalene sulfonate, and the second polymerization 3.0 parts of sodium β-naphthalene sulfonate, 750 parts of the monomer, styrene, having dissolved therein 3.0 parts of the catalyst comprising 1.9 parts of benzoyl peroxide and 1.1 part of t-butyl perbenzoate. The mixture was agitated at an r.p.m. of 400 and heated to 90° C. which took about one hour. Heating was continued for 7 hours at 90° C. after which the polymerized beads were separated from the cooled suspension by centrifuge, washed with water and air dried. The screen analysis is shown in Table III below and is graphically illustrated in FIG. 4. It can be seen that the sodium β-tetrahydronaphthalene sulfonate gave a sharper bead size distribution ratio (diameter in mm. at 10% by weight accumulated beads/diameter in mm. at 90% by weight accumulated beads) of 1.86 as compared with 2.27 for the sodium β-naphthalene sulfonate. While only 2.9% by weight fines were produced utilizing the sodium β-tetrahydronaphthalene sulfonate a total of 11.6% fines were produced using the sodium β-naphthalene sulfonate. Similarly, the novel extender produced only 0.6% oversized material whereas the sodium β-naphthalene sulfonate produced over twice that amount of 1.4% by weight of oversize material.

TABLE II

| Polymerization No. | Extender | Percent by weight extender based on total suspension | Percent by weight TCP based on total suspension | Screen Analysis U.S. Standard Sieve | | | | | | | | |
|---|---|---|---|---|---|---|---|---|---|---|---|---|
| | | | | Oversize 10 | A Cut 16 | B Cut | | C Cut | | | Fines | |
| | | | | | | 20 | 25 | 30 | 35 | 40 | 50 | Pan |
| II-1 | Na β-Tetrahydronaphthalene sulfonate | .023 | .116 | 4.7 | 83.3 | 9.1 | 1.2 | 1.0 | 0.4 | 0.2 | 0.1 | Nil |
| II-2 | Nacconol NRSF | .00075 | .108 | 0.6 | 21.6 | 35.0 | 15.6 | 12.6 | 5.6 | 4.4 | 3.2 | 2.4 |
| II-3 | Na β-Tetrahydronaphthalene sulfonate | .0406 | .125 | 0.1 | 2.2 | 36.9 | 28.1 | 21.1 | 7.2 | 3.0 | 1.2 | 0.2 |
| II-4 | Nacconol NRSF | .00075 | .125 | 0.8 | 1.6 | 18.2 | 21.6 | 20.4 | 13.6 | 9.8 | 9.4 | 4.6 |
| II-5 | Na β-Tetrahydronaphthalene sulfonate | .064 | .102 | 0.1 | 0.4 | 2.9 | 16.4 | 43.6 | 22.0 | 9.8 | 4.6 | 0.2 |
| II-6 | Nacconol NRSF | .0006 | .131 | 0.1 | 0.2 | 3.4 | 12.1 | 24.1 | 24.9 | 13.2 | 13.3 | 8.4 |

TABLE III

| Polymerization No. | Extender | Screen Analysis | | | | | | | | | Bead size[1] distribution ratio |
|---|---|---|---|---|---|---|---|---|---|---|---|
| | | Oversize 10 | A Cut | | B Cut | | C Cut | | Fines | | |
| | | | 14 | 16 | 20 | 25 | 30 | 35 | 40 | 50 Pan | |
| III-1 | Sodium β-tetrahydronaphthalene sulfonate | 0.6 | 2.3 | 2.3 | 21.1 | 25.8 | 33.7 | 7.8 | 3.5 | 2.4  0.5 | 1.04/0.56=1.86 |
| III-2 | Sodium beta-naphthalene sulfonate | 1.4 | 2.1 | 1.7 | 7.2 | 6.6 | 17.3 | 29.3 | 22.8 | 9.9  1.7 | .93/0.41=2.27 |

[1] Diameter in mm. at 10% by weight accumulated beads/diameter in mm. at 90% by weight accumulated beads.

EXAMPLE IV

In order to illustrate the minimum useful concentration of extender two polymerizations were carried out using the procedure described in Example III using the amounts of suspending agents shown in Table IV below. At a concentration of 0.0018% by weight of total suspension the amount of sodium β-tetrahydronaphthalene sulfonate present was insufficient to maintain the suspension. At a concentration of .015% by weight the suspension was stable although 10.7% of oversize material was produced.

TABLE IV

| Polymerization No. | Percent by weight Na β-tetrahydronaphthalene sulfonate | Percent by weight TCP | Screen Analysis | | | | |
|---|---|---|---|---|---|---|---|
| | | | Oversize | A Cut | B Cut | C Cut | Fines |
| IV-1 | .0018 | 0.3 | Suspension failed | | | | |
| IV-2 | .015 | 0.3 | 10.7 | 13.6 | 25.5 | 45.5 | 4.9 |

EXAMPLE V

To illustrate the effectiveness of the suspension system in preparing impact polymers the following polymerization was conducted. To a reactor, equipped with a three bladed impeller, there was added 100 parts of water containing as the suspending agent 2.0 parts of tricalcium phosphate and 1.0 part of sodium β-tetrahydronaphthalene sulfonate. To the water and suspending agents agitated at 80 r.p.m. there was then added the monomer mixture comprising 60 parts of styrene monomer and 25 parts of acrylonitrile monomer having dissolved therein 15 parts of polybutadiene rubber and as catalysts 0.5 part of lauroyl peroxide and 0.1 part of t-butyl perbenzoate along with, as a molecular weight modifier, 0.2 part of t-dodecyl mercaptan. The reactor flask was purged with nitrogen and heated to 90° C. during one hour and maintained at 90° C. for 8 hours after which the temperature was raised to 115° C. during an hour and a half and maintained at 115° C. for an additional two hours. The suspension product was cooled to room temperature and the beads were separated from the aqueous phase by centrifuge, washed with water, and air dried. The beads had the following screen analysis shown in Table V below where through 10 mesh to on 50 mesh beads represent prime product for impact polymer molding applications.

TABLE V

| | U.S. Standard Sieve No. | Percent by weight |
|---|---|---|
| | On 10 | Nil |
| Through 10 | On 16 | 1.0 |
| Through 16 | On 20 | 12.0 |
| Through 20 | On 25 | 10.0 |
| Through 25 | On 30 | 16.0 |
| Through 30 | On 35 | 11.0 |
| Through 35 | On 50 | 37.0 |
| Through 50 | | 13.0 |

The results show that in the preparation of ABS copolymers in a suspension polymerization system, where it is well known that it is difficult to maintain the suspension with conventional suspending systems, the novel suspending system of the invention not only produced a stable suspension but 87.0% of prime product.

The foregoing has described a polymerization process utilizing unique surface active extenders which allow the precise control of average bead size distribution such that beads of any particular diameter size range which is desired can be produced without producing beads of either extremely large or extremely small size. This process leads to tremendous cost savings particularly in an industry where it has been found that more and more polymer beads having a size range either close to the upper or lower limits of useful size are needed for use in certain applications.

I claim:
1. A process for producing polymer beads comprising suspending a vinyl aromatic monomer in an aqueous medium with the aid of finely divided tricalcium phosphate suspending agent and sodium β-tetrahydronaphthalene sulfonate extender in an amount based on total suspension of from about 0.015 to 2.0 percent by weight and heating and agitating said suspension to cause said monomer to polymerize.
2. The process of claim 1 wherein the vinyl aromatic monomer is styrene.
3. The process of claim 1 in which the tricalcium phosphate is present in an amount of from about 0.1 to 5.0 percent by weight of total suspension.
4. A process for producing polymer beads comprising:
   (1) suspending styrene in an aqueous medium, such that the styrene to water ratio is from 0.3 to 1.5 part by weight monomer per 1.0 part water with the aid of:
      (a) finely divided tricalcium phosphate, said phosphate being present in an amount of from about 0.1–5.0 percent by weight based on total suspension; and
      (b) sodium β-tetrahydronaphthalene sulfonate extender, a 0.1 percent by weight solution of said extender in 10 percent aqueous sodium chloride having a surface tension between about 61 and 45 dynes per centimeter and said extender being present in an amount based on total suspension of from about 0.015 to 2.0 percent by weight; and
   (2) heating and agitating said suspension to cause said monomer to polymerize.

References Cited

UNITED STATES PATENTS

| 2,594,913 | 4/1952 | Grim. |
| 2,687,408 | 8/1954 | Grim. |
| 2,948,710 | 8/1960 | D'Alelio et al. |
| 3,328,374 | 6/1967 | Ronden. |

OTHER REFERENCES

Schwartz & Perry—"Surface Active Agents," vol. 1, 1949, Interscience Publishers, p. 121.

JAMES A. SEIDLECK, Primary Examiner

U.S. Cl. X.R.

260—78.5, 84.3, 85.5, 87.3, 88.2, 91.5